(12) United States Patent
Aroca

(10) Patent No.: US 12,517,413 B1
(45) Date of Patent: Jan. 6, 2026

(54) LINEAR AND LOW-POWER OPTICAL MODULATOR DRIVER

(71) Applicant: ACACIA TECHNOLOGY, INC., San Jose, CA (US)

(72) Inventor: Ricardo Aroca, New York, NY (US)

( * ) Notice: Subject to any disclaimer, the term of this patent is extended or adjusted under 35 U.S.C. 154(b) by 0 days.

(21) Appl. No.: 16/449,321

(22) Filed: Jun. 21, 2019

Related U.S. Application Data

(63) Continuation of application No. 16/124,146, filed on Sep. 6, 2018, now abandoned, which is a continuation of application No. 15/581,693, filed on Apr. 28, 2017, now abandoned.

(60) Provisional application No. 62/444,957, filed on Jan. 11, 2017.

(51) Int. Cl.
G02F 1/225 (2006.01)
G02F 1/01 (2006.01)
G02F 1/21 (2006.01)

(52) U.S. Cl.
CPC .......... *G02F 1/2255* (2013.01); *G02F 1/0121* (2013.01); *G02F 1/2257* (2013.01); *G02F 1/212* (2021.01); *G02F 2201/06* (2013.01)

(58) Field of Classification Search
CPC .... G02F 1/0121; G02F 1/2255; G02F 1/2257; G02F 2001/212; G02F 2201/06; G02F 1/212
See application file for complete search history.

(56) References Cited

U.S. PATENT DOCUMENTS

| | | | | |
|---|---|---|---|---|
| 7,394,948 B1 * | 7/2008 | Zheng | ................. | G02B 6/132 |
| | | | | 385/2 |
| 7,991,299 B2 * | 8/2011 | Ota | ................. | H04B 10/505 |
| | | | | 398/198 |
| 9,372,354 B2 | 6/2016 | Manouvrier | | |
| 9,835,927 B2 | 12/2017 | Velthaus et al. | | |
| 10,488,682 B2 * | 11/2019 | Doerr | ................. | G02F 1/218 |
| 12,158,639 B2 * | 12/2024 | Vitic | ................. | G02F 1/0123 |
| 2005/0124311 A1 | 6/2005 | Mahmoudi et al. | | |
| 2006/0067708 A1 * | 3/2006 | Keil | ................. | G02F 1/0121 |
| | | | | 398/183 |
| 2008/0212913 A1 * | 9/2008 | Gill | ................. | G02F 1/025 |
| | | | | 385/2 |
| 2009/0034987 A1 | 2/2009 | Kang et al. | | |

(Continued)

OTHER PUBLICATIONS

Aroca et al., A 2.4-V 60-Gb/s CMOS Driver With Digitally Variable Amplitude and Pre-Emphasis Control at Multiple Peaking Frequencies. IEEE J Solid-State Circ. Oct. 2011;46(10):2226-39.

*Primary Examiner* — Rhonda S Peace

(74) *Attorney, Agent, or Firm* — Patterson + Sheridan, LLP

(57) ABSTRACT

A modulator driver for Mach Zehnder optical modulators is described. The modulator driver may be configured to limit power consumption while preserving linearity of the response. A modulator driver may comprise a first transconductance stage, a second transconductance stage and a current buffer. The current buffer may be configured to drive the radio-frequency path (RF) of a Mach Zehnder modulator with output signals. The first and second transconductance stages may be configured to decouple the path corresponding to the alternating current (AC) from the path corresponding to the direct current (DC). The first and second transconductance stages may additively combine the respective AC signals while subtractively combine the respective DC signals.

30 Claims, 15 Drawing Sheets

(56) References Cited

U.S. PATENT DOCUMENTS

| | | | |
|---|---|---|---|
| 2015/0062689 A1 | 3/2015 | Doerr | |
| 2016/0087727 A1* | 3/2016 | Nagatani | H03G 3/3084 |
| | | | 330/296 |
| 2016/0352325 A1 | 12/2016 | Chen et al. | |
| 2017/0170894 A1 | 6/2017 | Gu et al. | |
| 2017/0285437 A1* | 10/2017 | Doerr | G02F 1/2257 |
| 2018/0059504 A1* | 3/2018 | Mekis | G02F 1/025 |
| 2018/0314080 A1* | 11/2018 | Qi | H04B 10/588 |
| 2019/0094648 A1* | 3/2019 | Williams | G02F 1/2255 |
| 2021/0124234 A1* | 4/2021 | Vitic | G02F 1/025 |
| 2021/0232016 A1* | 7/2021 | Ogiso | G02B 6/12 |
| 2021/0373410 A1* | 12/2021 | Zhou | G02F 1/212 |

\* cited by examiner

LINEAR AND LOW-POWER OPTICAL MODULATOR DRIVER

RELATED APPLICATIONS

This Application is a continuation claiming the benefit under 35 U.S.C. § 120 of U.S. application Ser. No. 16/124, 146, filed on Sep. 6, 2018, and entitled "LINEAR AND LOW-POWER OPTICAL MODULATOR DRIVER," which is hereby incorporated herein by reference in its entirety.

U.S. application Ser. No. 16/124,146 is a continuation claiming the benefit under 35 U.S.C. § 120 of U.S. application Ser. No. 15/581,693, filed on Apr. 28, 2017, and entitled "LINEAR AND LOW-POWER OPTICAL MODULATOR DRIVER," which is hereby incorporated herein by reference in its entirety.

U.S. application Ser. No. 15/581,693 claims the benefit under 35 U.S.C. § 119 (e) of U.S. Provisional Application Ser. No. 62/444,957, filed on Jan. 11, 2017, and entitled "LINEAR AND LOW-POWER OPTICAL MODULATOR DRIVER," which is hereby incorporated herein by reference in its entirety.

BACKGROUND

Field

The present application relates to modulator drivers for optical Mach Zehnder modulators.

Related Art

Some modulator drivers for optical Mach Zehnder modulators include current mode logic (CML) drivers. CML drivers are configured to drive optical Mach Zehnder modulators with traveling waves. A traveling wave travels along a radio-frequency (RF) path of a Mach Zehnder modulator and modulates an optical signal traveling along an optical path of the Mach Zehnder modulator.

BRIEF SUMMARY

According to one aspect of the present application, an integrated optical device is provided. The integrated optical device may comprise a Mach Zehnder Modulator (MZM) comprising an optical path and a radio frequency (RF) path; and a modulator driver coupled to the RF path of the MZM, the modulator driver comprising: a first transconductance stage; a second transconductance stage; and a current buffer coupled to the first and second transconductance stages, wherein the first and second transconductance stages are configured such that DC outputs of the first and second transconductance stages are subtractively combined and AC outputs of the first and second transconductance stages are additively combined.

According to another aspect of the present application, an integrated optical device is provided. The integrated optical device may comprise a Mach Zehnder Modulator (MZM) comprising an optical path and a radio frequency (RF) path; and a modulator driver coupled to the RF path of the MZM, the modulator driver comprising: a first transconductance stage; a second transconductance stage connected in series with the first transconductance; and a current buffer coupled to the first and second transconductance stages, wherein the first transconductance stage comprises a first terminal, the second transconductance stage comprises a second terminal and the current buffer comprises a third terminal, and wherein the first terminal is connected to the second terminal and to the third terminal.

According to yet another aspect of the present application, a method of controlling a modulator driver comprising a first transconductance stage, a second transconductance stage and a current driver is provided. The method may comprise controlling the first transconductance stage to provide a first alternate current (AC) signal and a first direct current (DC) signal to the current buffer; controlling the second transconductance stage to provide a second alternate current (AC) signal and a second direct current (DC) signal to the current buffer, wherein the first and second AC signals have common orientations and the first and second DC signals have opposite orientations; and in response to receiving the first and second AC signals, controlling the current driver to modulate an optical signal propagating along a Mach Zehnder Modulator (MZM).

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
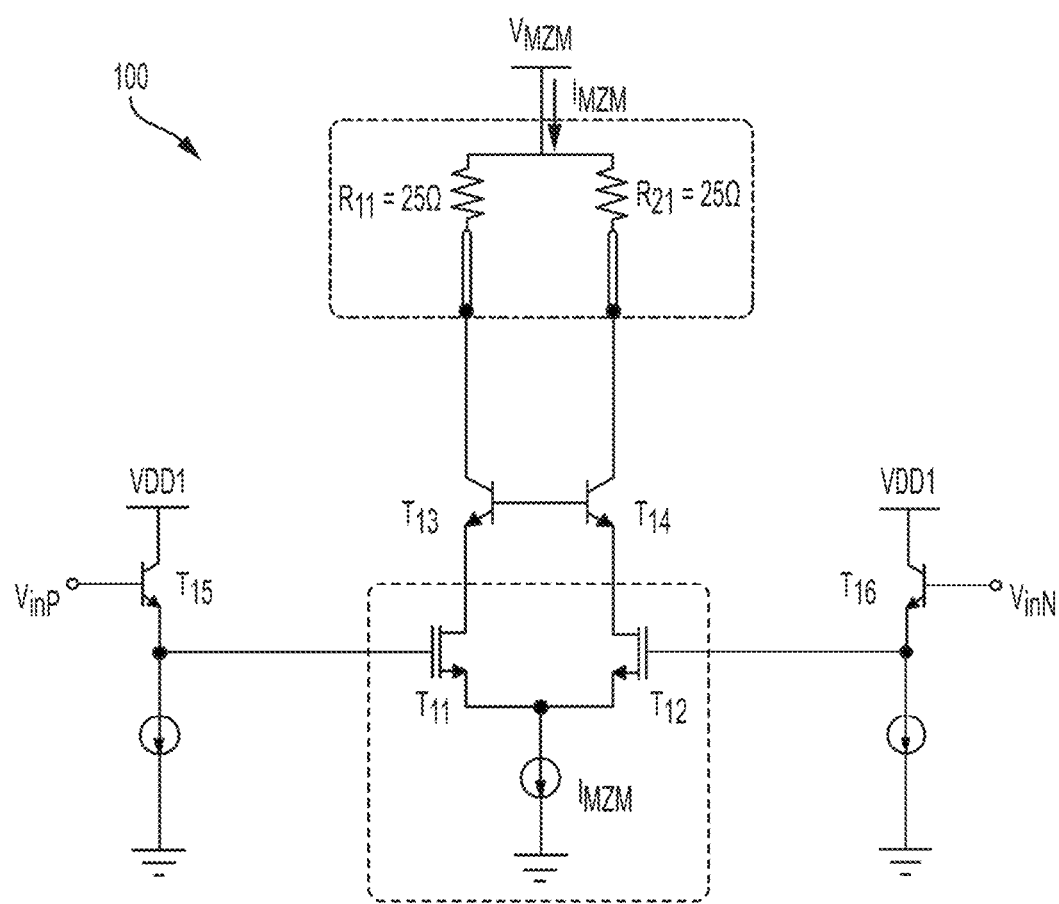
FIG. 1 is a circuit diagram illustrating a current mode logic (CML) driver.

Applicant has appreciated that the power consumption associated with modulator drivers for optical Mach Zehnder modulators can be significantly reduced by limiting the direct current (DC) signal flowing in the modulator driver. In some embodiments, the DC current may be limited by using a plurality of transconductance stages configured to subtractively combine the respective DC signals, thus limiting the DC signal absorbed by the voltage supply. In this way, the power consumption of a modulator driver for a Mach Zehnder modulator may be significantly decreased with respect to conventional modulator drivers.

To ensure the integrity of optical signals generated using Mach Zehnder modulators, it may be desirable in at least some embodiments that the modulator driver configured to drive such Mach Zehnder modulators exhibits a highly linear response. This may be especially true for Mach Zehnder modulators that are configured to produce higher order modulation schemes, such as 4-quadrature amplitude modulation (4-QAM), 16-QAM, 32-QAM or 64-QAM. Driving a modulator of this type with a modulator driver that does not exhibit a highly linear response may cause the resulting modulated optical signal to experience distortion. For example, the optical signal may experience slow transitions or jitter, which may pose an upper limit to the modulation speed before bit errors arise.

To provide a linear response suitable for higher order modulation schemes, conventional modulator drivers, such as current mode logic (CML) drivers, are configured to drive currents that are large enough to operate their transistors in the linear region. The drawback of this approach is that the power consumption associated with the modulator driver can be exorbitant. Because the power consumption of the modulator driver is often the limiting factor with respect to the overall power consumption of an optical transceiver, such behavior is undesirable.

According to one aspect of the present application, the power consumption of a modulator driver may be decreased, with respect to conventional modulator drivers, without sacrificing linearity, by limiting the DC signal flowing in the modulator driver while boosting the AC signal. In some embodiments, a modulator driver may comprise a first transconductance stage, a second transconductance stage and a current buffer. The first and the second transconductance stages may be configured to bias the current buffer by subtractively combining the respective DC signals, thus limiting the power consumption. At the same time, the first and second transconductance stages may be configured to drive the current buffer with the modulating signal by additively combining the respective alternating current (AC) signals, thus ensuring a suitable degree of linearity.

The aspects and embodiments described above, as well as additional aspects and embodiments, are described further below. These aspects and/or embodiments may be used individually, all together, or in any combination of two or more, as the application is not limited in this respect.

FIG. 1 is a circuit diagram illustrating a conventional current mode logic driver (CML). CML driver 100 comprises a pair of N-metal oxide semiconductor (NMOS) transistors T11 and T12. Transistors T11 and T12 are configured to receive an input differential signal pair $V_{inP}$, $V_{inN}$, through transistors T15 and T16 respectively. Transistors T11 and T12 are connected in a common-source configuration, and are biased through the current generator labeled $I_{MZM}$. When an input signal is received, transistors T11 and T12 drive bipolar transistors T13 and T14, which are connected in a common-base configuration. In response, transistors T13 and T14 drive resistors R11 and R12, which represent the resistances associated with the radio-frequency (RF) path of a Mach Zehnder modulator. Both R11 and R12 have a resistance of 25Ω.

The power consumption of CML driver 100 is equal to the supply voltage $V_{MZM}$ multiplied by the current $I_{MZM}$ provided by the voltage supply, if the power absorbed by voltage supply $V_{DD1}$ is neglected. If the voltage swing with which the Mach Zehnder modulator must be driven is equal to 4Vpp (peak-to-peak), then $V_{MZM}$ must be at least equal to 4V. To provide headroom for the transconductance amplifier to operate in the linear region, the supply voltage is often provided with an additional 12.5%, thus leading to 4.5V. The current $I_{MZM}$ necessary to drive the RF path with the desired peak-to-peak voltage is equal to 4V/50Ω=80 mA. To further improve linearity, the current $I_{MZM}$ is often increased beyond the target value. For example, assuming $I_{MZM}$=90 mA, the power consumption of CML driver 100 is equal to 4V×90 mA=0.4 W. As will described further below, by using a modulator driver of the types described herein, the power consumption may be significantly reduced from the 0.4 W associated with CML driver 100.

Figure 2A:
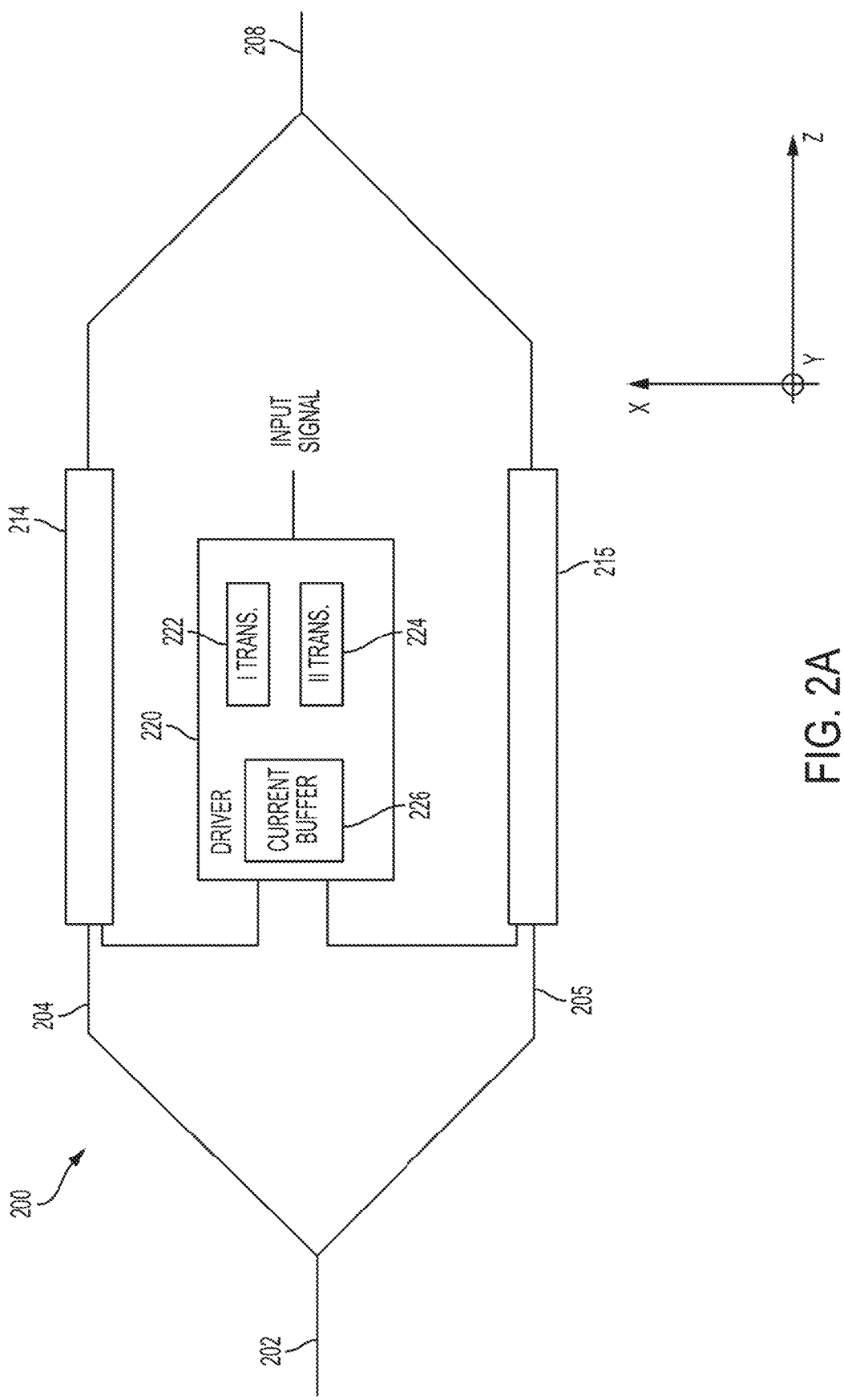
FIG. 2A is block diagram illustrating a modulator driver for a Mach Zehnder modulator, according to some non-limiting embodiments.

A modulator driver of the types described herein may be used in connection with an optical Mach Zehnder modulator (MZM). Mach Zehnder modulators comprise a least one optical path and at least one RF path. The optical path may carry an optical signal and the RF path may carry an RF signal configured to modulate the optical signal. The Mach Zehnder modulator may be coupled to a modulator driver configured to drive the RF path with the RF signal. FIG. 2A is a block diagram illustrating an optical transmitter 200 comprising a Mach Zehnder modulator and a modulator driver. The Mach Zehnder modulator may comprise an input optical waveguide 202, an output optical waveguide 208, and optical arms 204 and 205, coupled between the input and the output optical waveguides. In some embodiments, the first optical arm comprises a first phase modulator 214 and the second optical arm comprises a second phase modulator 215. However, in other embodiments, only one optical arm may comprise a phase modulator. The phase modulator may be configured to modulate the phase of the optical signals traveling along the optical arms. As the optical signals are recombined into the output optical waveguide, the relative phase difference between the optical signals may give rise to an amplitude modulation via optical interference.

The phase modulation may be obtained by driving the Mach Zehnder modulator with an RF signal. In some embodiments, a modulator driver 220 may be used. Modulator driver 220 may be configured to receive an input signal and may comprise a first transconductance stage 222, a second transconductance stage 224 and a current buffer 226. While modulator driver 220 comprises two transconductance stages, any other suitable number of transconductance stages may be used. The modulator driver 220 may be configured to, in response to receiving the input signal, generate a pair of differential signals and to drive the phase modulators. In some embodiments, the Mach Zehnder modulator may be implemented in silicon photonics and the modulator driver may be implemented using complementary metal-oxide-semiconductor (CMOS) circuitry. In some embodiments, the Mach Zehnder modulator may be disposed on a first substrate, such as a silicon substrate or a silicon-on-insulator (SOI) substrate, and the modulator driver may be disposed on a second substrate, such as a silicon substrate. The first and second substrates may be bonded using any suitable technique, such as wire bonding or flip-chip bonding. In other embodiments, the Mach Zehnder modulator and the modulator driver may be disposed on the same silicon substrate. Other materials may be used to fabricate the Mach Zehnder modulator, including InP, silica and GaAs. Modulator driver 220 may be configured to receive an input signal and to drive the Mach Zehnder modulator with an amplified version of the input signal. The amplification gain provided by modulator driver 220 may be between 3 dB and 60 dB, between 6 dB and 30 dB, between 10 dB and 30 dB, between 10 dB and 20 dB, or between any other suitable values or range of values.

Figure 2B:
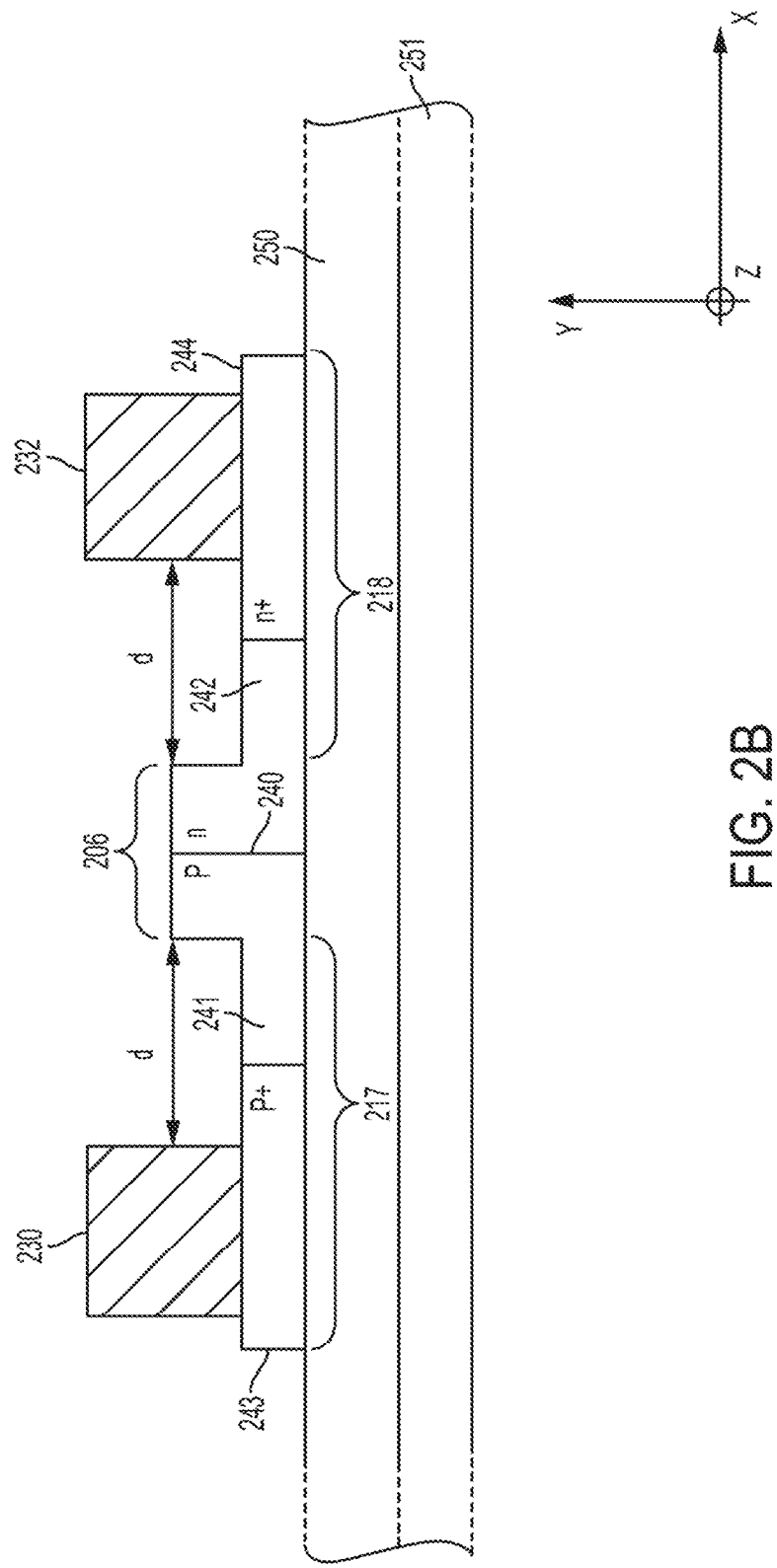
FIG. 2B is a cross sectional view illustrating a pn-junction phase shifter, according to some non-limiting embodiments.

Phase modulators 214 and 215 may be implemented using any suitable device. The modulation may be obtained using the thermo-optic effect and/or the free-carrier plasma dispersion effect. For example, a phase modulator may be implemented using a pn-junction. FIG. 2B is a cross sectional view of an example of a phase modulator using a pn-junction, according to some non-limiting embodiments. As illustrated, the phase modulator may comprise bottom cladding 250, which may be disposed on a substrate 251. In some embodiments, a film of dielectric material, such as silicon, may be disposed on top of the bottom cladding. The dielectric film may be patterned to form optical waveguide 206. In some embodiments, regions of the dielectric film adjacent the optical waveguide 206 may be partially etched to form shallow dielectric regions 217 and 218. In some embodiments, optical waveguide 206 may be doped to form a pn-junction. In the non-limiting example illustrated in FIG. 2B the optical waveguide comprises a pn-junction formed by doping region 242 with an n-doping material, such as phosphorous or arsenic, and region 241 with a p-doping material, such as boron. While the junction 240 is located approximately at the center of optical waveguide 206, other configurations are also possible. Region 243, adjacent region 241, may be highly doped with a p-doping material. For example, region 243 may be doped with a concentration of dopants that is between $10^{19}$ cm$^{-3}$ and $10^{21}$ cm$^{-3}$, including any range or value within that range. Region 244, adjacent region 242, may be highly doped with an n-doping material. For example, region 244 may be doped with a concentration of dopants that is between $10^{19}$ cm$^{-3}$ and $10^{21}$ cm$^{-3}$, including any range or value within that range. In some embodiments, electrodes 230 and 232 may be disposed on top of regions 243 and 244 respectively. The highly doped regions may be configured to form ohmic contacts with electrodes 230 and 232.

Electrodes 230 and 232 may be disposed at a suitable distance d from the optical waveguide 206 to allow for modulation of the optical signal traveling along optical waveguide 206. Distance d may be between 500 nm and 50 µm in some embodiments, between 1 µm and 50 µm in some embodiments, between 1 µm and 20 µm in some embodiments, between 1 µm and 10 µm in some embodiments, between 1 µm and 5 µm in some embodiments, between 2 µm and 4 µm in some embodiments, or may assume any value within any of these ranges or other suitable ranges. In other embodiments, the distance between electrode 230 and optical waveguide 206 may differ from the distance between electrode 232 and optical waveguide 206.

In the non-limiting example illustrated in FIG. 2B, the p-doped region and the n-doped region are disposed beside one another to form a vertical junction 240. In other embodiments, a p-doped region and an n-doped region may be configured to form a horizontal junction.

The device illustrated in FIG. 2B may be configured to operate as a phase shifter. In some embodiments, by injecting electric carriers into optical waveguide 206, the phase of an optical signal propagating along optical waveguide 206 may be shifted with respect to thermal equilibrium. Injection of carriers may be achieved by forward biasing the pn-junction using electrodes 230 and 232. In some embodiments, by depleting waveguide 206 from electric carriers, the phase of an optical signal propagating along optical waveguide 206 may be shifted with respect to thermal equilibrium. Depletion of carriers in all or part of the waveguide may be achieved by reverse biasing the pn-junction using electrodes 230 and 232. Electrodes 230 and 231 may collectively form an RF path, which may be driven using a modulator driver of the type described herein.

Figure 3A:
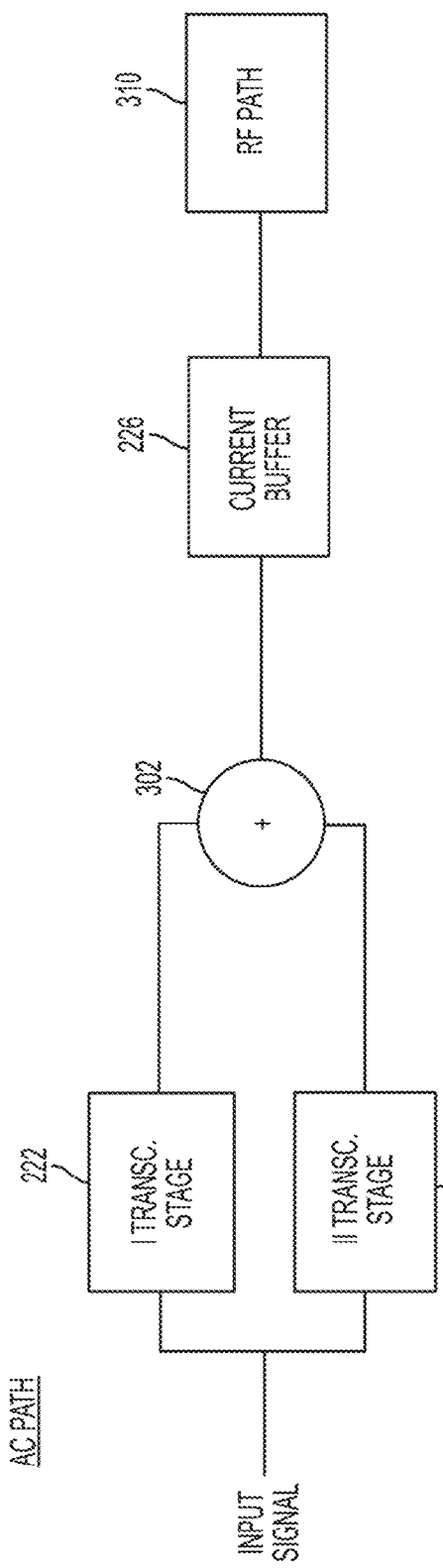
FIG. 3A is a block diagram illustrating the path associated with an alternating current (AC) signal within the modulator driver of FIG. 2A, according to some non-limiting embodiments.
Figure 3B:
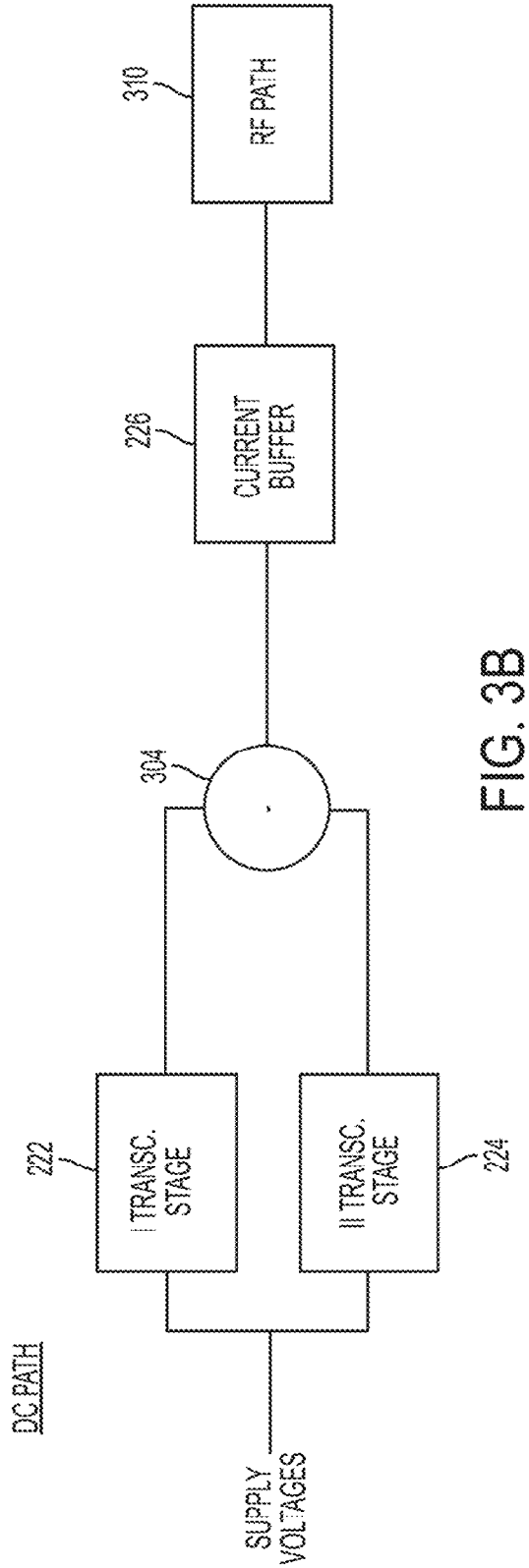
FIG. 3B is a block diagram illustrating the path associated with a direct current (DC) signal within the modulator driver of FIG. 2A, according to some non-limiting embodiments.

The first and second transconductance stages 222 and 224 illustrated in FIG. 2A may be configured to additively combine the respective AC signals, while subtractively combine the respective DC signals. FIG. 3A-3B are block diagrams illustrating the AC path and the DC path respectively, within modulator driver 220. The AC path, shown in FIG. 3A, represents the manner in which AC signals are combined. In response to receiving an input signal, such as a differential signal pair, the first and second transconductance stages are configured to generate a first AC signal and a second AC signal respectively. Such AC signals may be driven in phase with respect to each other, such that they may be combined additively, as shown by additive block 302. The resulting AC signal may be provided to current buffer 226, which may, in response, drive the RF path 310 of a Mach Zehnder modulator with an AC output signal.

The DC path, shown in FIG. 3B, represents the manner in which DC signals are combined. In response to receiving one or more supply voltages, the first and second transconductance stages are configured to generate a first DC signal and a second DC signal respectively. Such DC signals may be driven out-of-phase with respect to each other, such that they may be combined subtractively, as shown by subtractive block 304. The resulting DC signal may be provided to current buffer 226, which may, in response, bias the RF path with a DC signal.

Figure 4A:
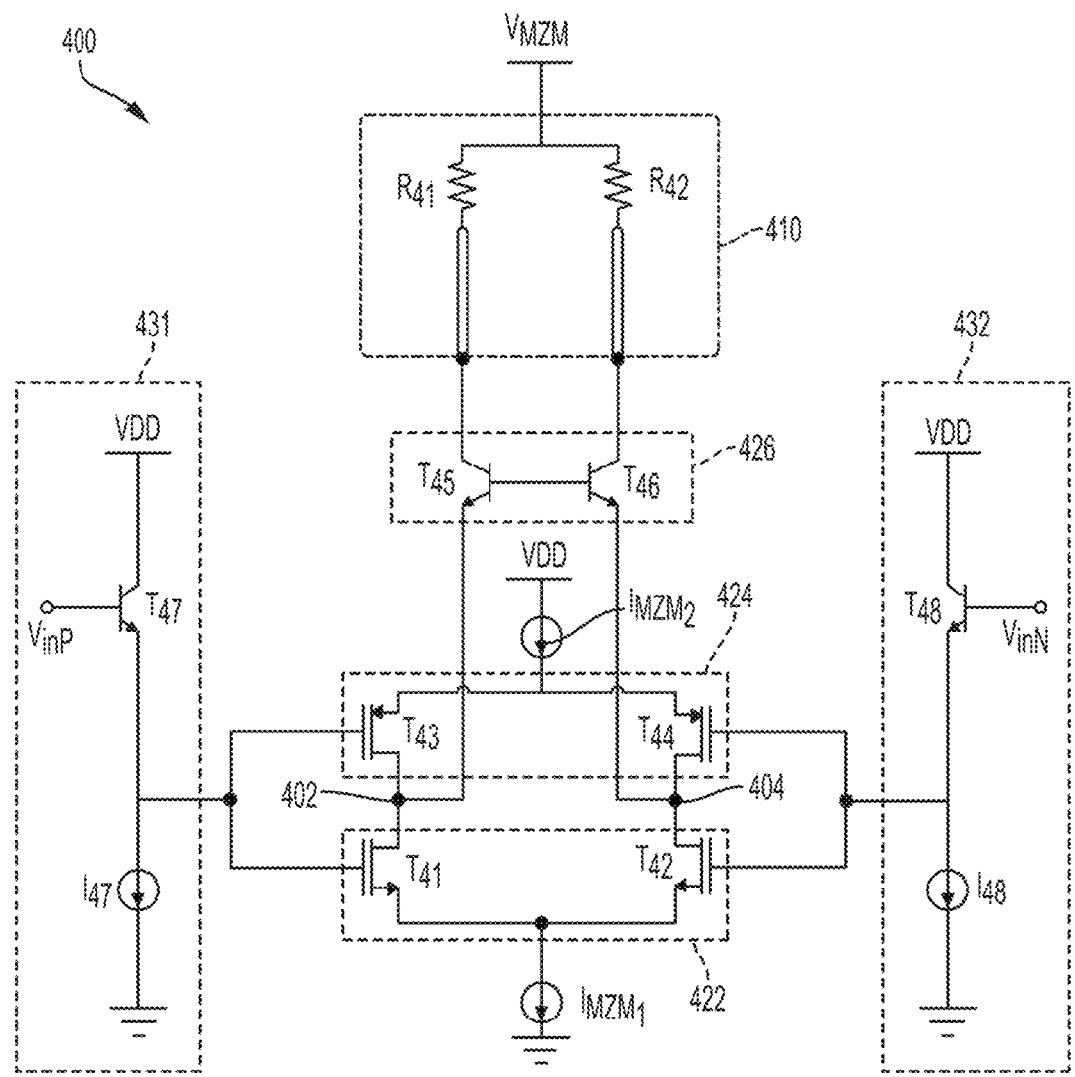
FIG. 4A is a circuit diagram illustrating an example of a modulator driver comprising a first transconductance stage, a second transconductance stage and a current buffer, according to some non-limiting embodiments.

A non-limiting implementation of modulator driver 220 is illustrated in FIG. 4A. Modulator driver 400 may comprise first transconductance stage 422, serving as first transconductance stage 222, second transconductance stage 424, serving as second transconductance stage 224, and current buffer 426, serving as current buffer 226. The current buffer may be coupled to an RF path 410, which may serve as RF path 310. The modulator driver may further comprise a first input driver 431 and a second input driver 432. Input drivers 431 and 432 may be configured to drive the transconductance stages with input signals $V_{inP}$ and $V_{inN}$. Input driver 431 may comprise a transistor T47 configured to provide input signal $V_{inP}$ to the transconductance stages, and input driver 432 may comprise a transistor T48 configured to provide input signal $V_{inN}$ to the transconductance stages. Transistors T47 and T48 may be biased through respective current generators $I_{47}$ and $I_{48}$. Input signals $V_{inP}$ and $V_{inN}$ may be differential.

In some embodiments, transconductance stage 422 may comprise transistors T41 and T42. Transistors T41 and T42 may be NMOS transistors in some embodiments. However, any other suitable type of transistor may be used. Transistors T41 and T42 may be connected in a common-source configuration and may be biased, through their respective source terminals, using current generator $I_{MZM1}$, which may be implemented using any suitable circuit, such as a current mirror.

In some embodiments, transconductance stage 424 may comprise transistors T43 and T44. Transistors T43 and T44 may be PMOS transistors in some embodiments. However, any other suitable type of transistor may be used. Transistors T43 and T44 may be connected in a common-source configuration and may be biased, through their respective source terminals, using current generator $I_{MZM2}$, which may be implemented using any suitable circuit, such as a current mirror. In some embodiments, the current generated by $I_{MZM1}$ is greater than the current generated by $I_{MZM2}$. In some embodiments, the current generated by $I_{MZM1}$ is approximately twice (e.g., between 1.5 times and 2.5 times) the current generated by $I_{MZM2}$.

In some embodiments, transistor T43 may have a terminal connected to a terminal of transistor T41 via node 402. For example, the transistors may be connected through their respective drain terminals. Similarly, transistor T44 may have a terminal connected to a terminal of transistor T42 via node 404. For example, the transistors may be connected through their respective drain terminals. The gates of transistors T43 and T41 may be configured to receive $V_{inP}$ via input driver 431 and the gates of transistors T44 and T42 may be configured to receive $V_{inN}$ via input driver 432. In some embodiments, the source terminals of transistors T41 and T42 may be coupled to a ground terminal while the source terminals of transistors T43 and T44 may be coupled to a supply voltage $V_{DD}$. As illustrated, modulator driver 400 may be configured to operate differentially. However, a single-ended configuration is also possible. In such configuration, each transconductance stage may have one transistor, and the transconductance stages may be connected through a single node.

In some embodiments, current buffer 426 may be connected to nodes 402 and 404. However, in the single ended configuration, a current buffer may be connected to a single node only. Current buffer 426 may comprise transistors T45 and T46, which may be implemented, in some embodiments, with heterojunction bipolar transistors (HBT). HBT transistors may be used because of the low impedance provided. However, any other suitable type of transistor may be used, such as a metal-oxide-semiconductor field effect transistor (MOSFET) or a bipolar junction transistor (BJT). Transistor T45 may have an emitter terminal connected to node 402 and transistor T46 may have an emitter terminal connected to node 404. Transistors T45 and T46 may be connected in a common-base configuration. In some embodiments, the bases of the two transistors may be connected. Being the transconductance stages in a common-source configuration and the current buffer in a common-base configuration in some embodiments, modulator driver 400 is in a cascode configuration. In this configuration, modulator driver 400 may exhibit an improved cutoff frequency, with respect to single stage amplifiers. Transistor T45 may be connected to resistor R41 and transistor T46 may be connected to resistor R42. Resistors R41 and R42 may represent the equivalent resistances of RF path 410 of a Mach Zehnder modulator. The RF path may be provided with a supply voltage $V_{MZM}$. In some embodiments, $V_{MZM}$ may be greater than $V_{DD}$.

Figure 4C:
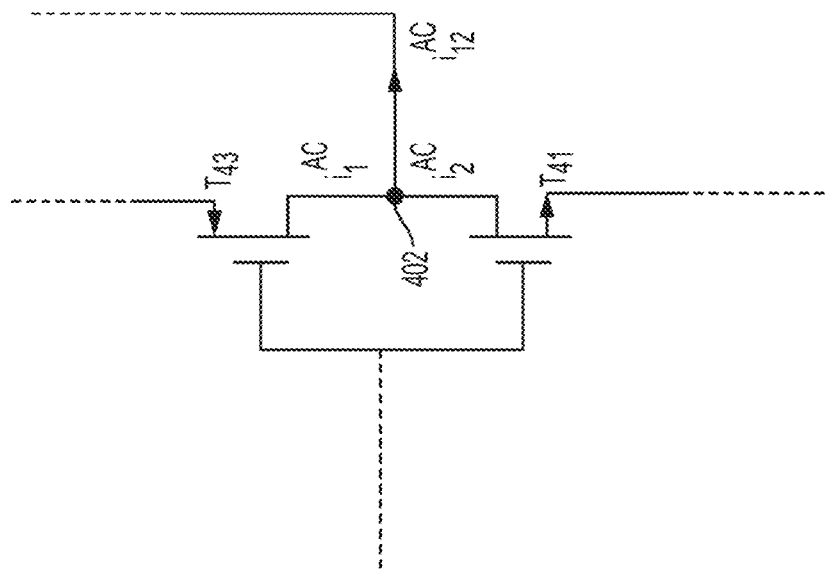
FIGS. 4B-4C are circuit diagrams illustrating portions of the modulator driver of FIG. 4A in further detail, according to some non-limiting embodiments.
Figure 4B:
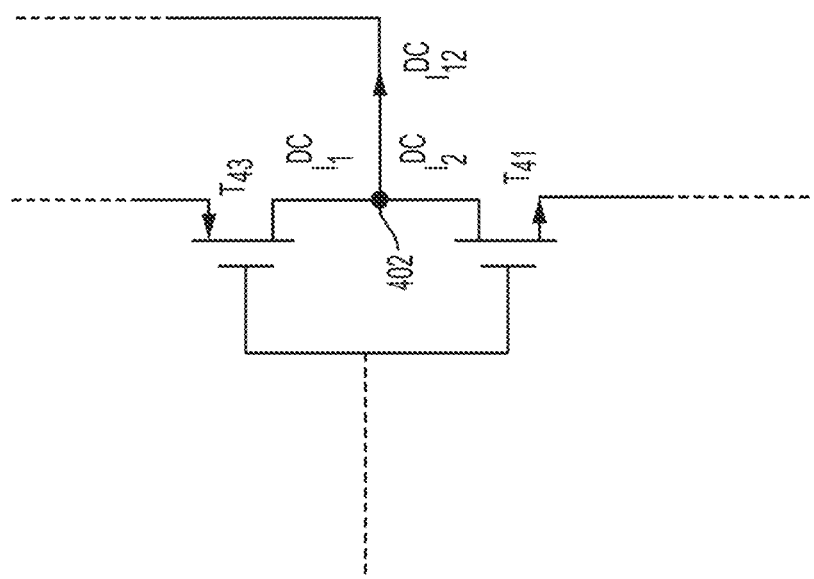

During operation of modulator driver 400, transistors T41 and T43 may be configured to provide DC currents, to transistor T45, having opposite orientations. FIG. 4B illustrates schematically the DC currents provided by transistors T41 and T43, according to some non-limiting embodiments. As illustrated, current $I^{DC}_1$ is the DC current provided by transistor T43 and current $I^{DC}_2$ is the DC current provided by transistor T41. Because $I^{DC}_1$ is directed toward node 402 at a certain time while $I^{DC}_2$ is directed away from node 402, the resulting DC current $I^{DC}_{12}$ provided to the current buffer equals the difference of the absolute values of the DC currents $I^{DC}_1$ and $I^{DC}_2$. On the other hand, transistors T41 and T43 may be configured to provide AC currents, to transistor T45, having the same orientation. FIG. 4C illustrates schematically the AC currents provided by transistors T41 and T43, according to some non-limiting embodiments. As illustrated, current $i^{AC}_1$ is the AC current provided by transistor T43 and current $i^{AC}_2$ is the AC current provided by transistor T41. Because $i^{AC}_1$ and $i^{AC}_2$ are both directed toward node 402 (or are both directed away from node 402), the resulting AC current $i^{AC}_{12}$ provided to the current buffer equals the sum of the absolute values of the AC currents $i^{AC}_1$ and $i^{AC}_2$.

Referring back to FIG. 4A, the power consumption of modulator driver 400 may be computed by computing the power absorbed by voltage supply $V_{MZM}$ and $V_{DD}$. In some embodiments, $V_{DD}$ may be between 0.7V and 2V, between 0.75V and 1.75V, between 1V and 1.6V, or between any suitable values within such ranges. The value of $V_{DD}$ may depend, in some embodiments, on the supply voltage available for the technological fabrication node used for modulator driver 400. In some embodiments, $V_{MZM}$ may be between 2V and 5V, between 3V and 5V, between 3V and 4V, between 3V and 3.5V, between 3.5V and 4V, or between any suitable values within such ranges. The value of $V_{MZM}$ may be chosen, in some embodiments, depending on the desired voltage swing across the terminals of the modulator. For example, the value of $V_{MZM}$ may be chosen to enhance linearity of the modulating signal while also limiting power consumption.

Assuming, by way of example, that the Mach Zehnder modulator is driven with 4Vpp, $V_{MZM}$ may be set to 3.2V and $V_{DD}$ may be set to 1.5V. In this circumstance, the current $I_{MZM}$ provided by $V_{MZM}$ is 50 mA and the current $I_{DD}$ provided by $V_{DD}$ is equal to 40 mA. As a result, neglecting the current absorbed by the input drivers, the power absorbed from $V_{DD}$ is 0.06 W and the power absorbed from $V_{MZM}$ is 0.16 W, thus leading to an overall power consumption of 0.22 W. Such power consumption is significantly lower than the power consumption associated with the modulator driver of FIG. 1.

Figure 5A:
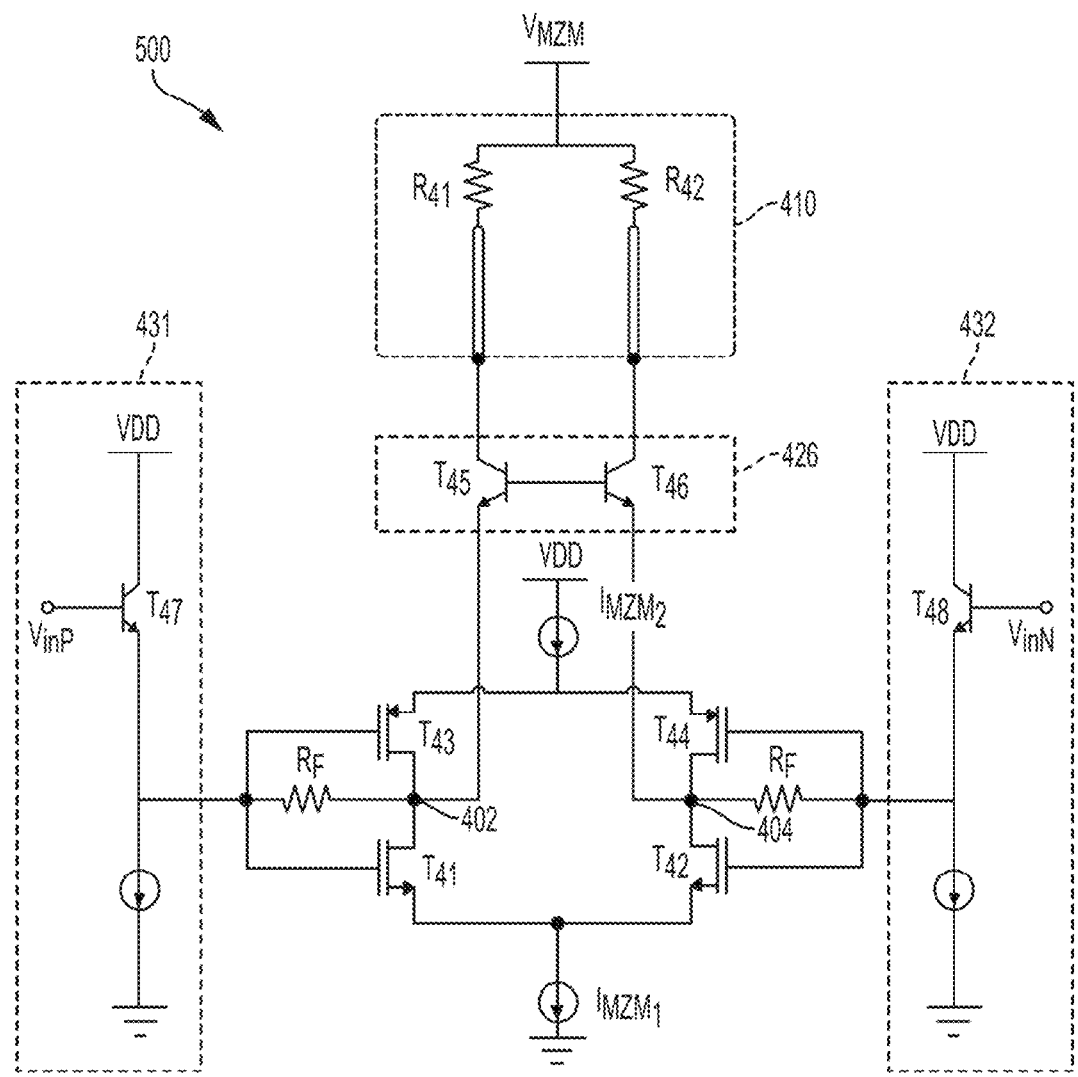
FIG. 5A is a circuit diagram illustrating an example of a modulator driver arranged in a feedback configuration, according to some non-limiting embodiments.

FIG. 5A illustrates an implementation of modulator driver 220 arranged in a feedback configuration, according to some non-limiting embodiments. Modulator driver 500 may comprise some or all the components of modulator driver 400. In addition, modulator driver 500 may comprise a first resistor RF, coupled between node 402 and input driver 431, and a second resistor RF, coupled between node 404 and input driver 432. Resistors RF may be configured to provide feedback signals between the input terminals and the output terminals of the transconductance stages. Being arranged in a feedback configuration, the presence of resistors RF may further increase the linearity of the modulator driver, by increasing the harmonic distortion cancellation. In some embodiments, the presence of resistors RF may increase the bandwidth of the modulator driver.

Figure 5B:
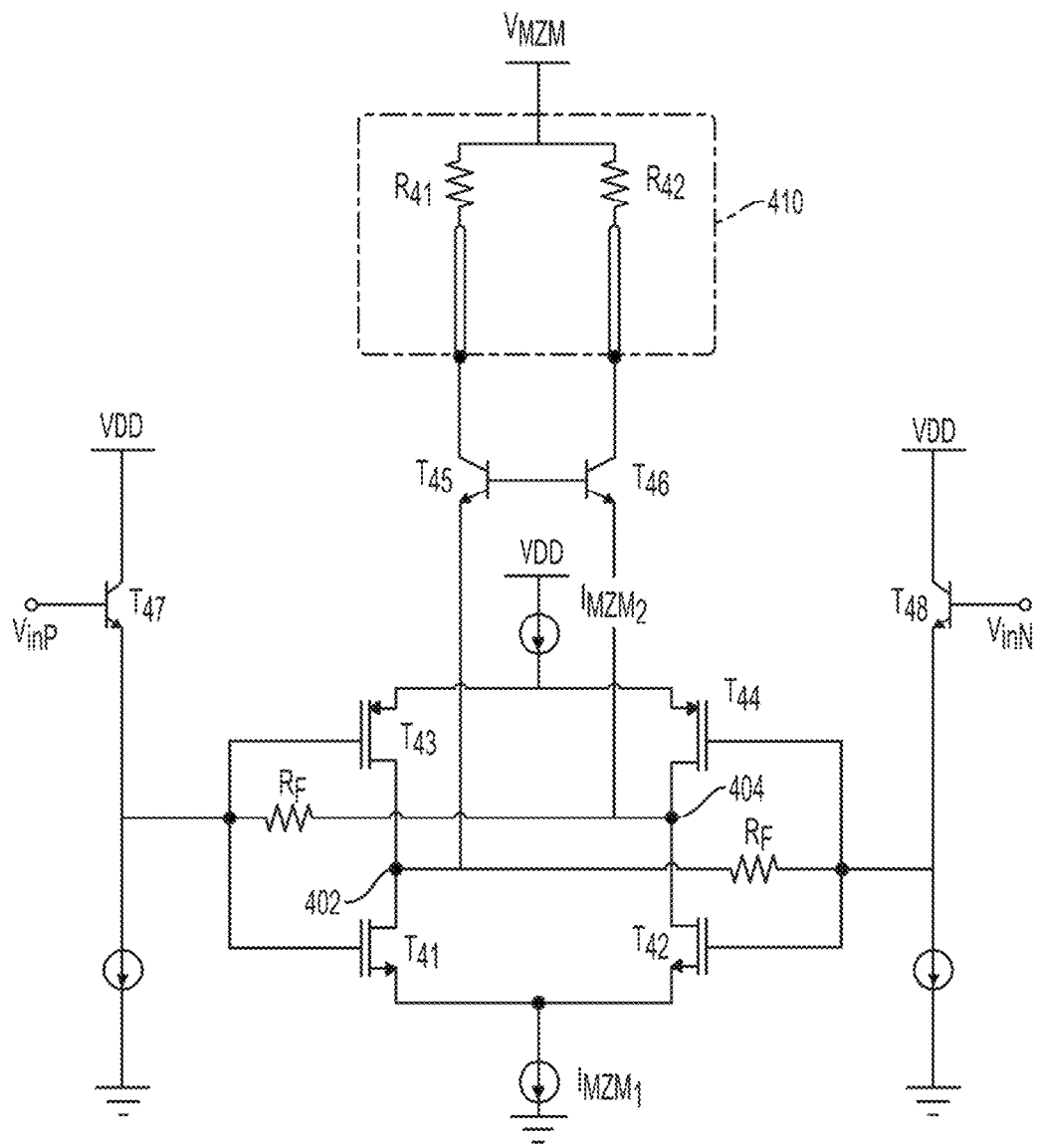
FIG. 5B is a circuit diagram illustrating an example of a modulator driver arranged in a feedforward configuration, according to some non-limiting embodiments.

In some circumstances, the input signals may have amplitudes that are sufficiently large (e.g., at least $\frac{1}{3}V_{DD}$ or at least $\frac{1}{2}V_{DD}$) to cause some of the transistors of the modulator driver to operate at the boundary of their linear region, or even outside their linear region. In some embodiments, feedforward configurations may be used to extend the linear region of one or more transistors. In some embodiments, the feedforward configuration may improve the harmonic distortion of the transistors by reducing the even and/or odd order harmonics. In this way, the transistors may operate within the linear region even in the presence of large input signals. In a feedforward configuration, the input terminal of one transistor may be coupling to the output terminal of a corresponding transistor of a transconductance stage. Such a coupling may be achieved through any suitable impedance element, such as a resistor. FIG. 5B illustrates an alternative implementation of modulator driver 220 arranged in a feedforward configuration. In this configuration, resistors $R_F$ may be connected between the input terminal of a transistor and the output terminal of a corresponding transistor of a transconductance stage. For example, a resistor $R_F$ may be connected between the gate terminals of transistors T43 and T41 and the drain terminals of transistors T44 and T42. Similarly, another resistor $R_F$ may be connected between the drain terminals of transistors T43 and T41 and the gate terminals of transistors T44 and T42. In this configuration, transistors T41, T42, T43, and T44 may exhibit an extended linear region. As a drawback, the feedback configuration described herein may be more sensitive, compared to the feedback configuration, to fluctuations in the voltage at nodes 402 and 404, and experience variations in the DC bias voltage.

Figure 6A:
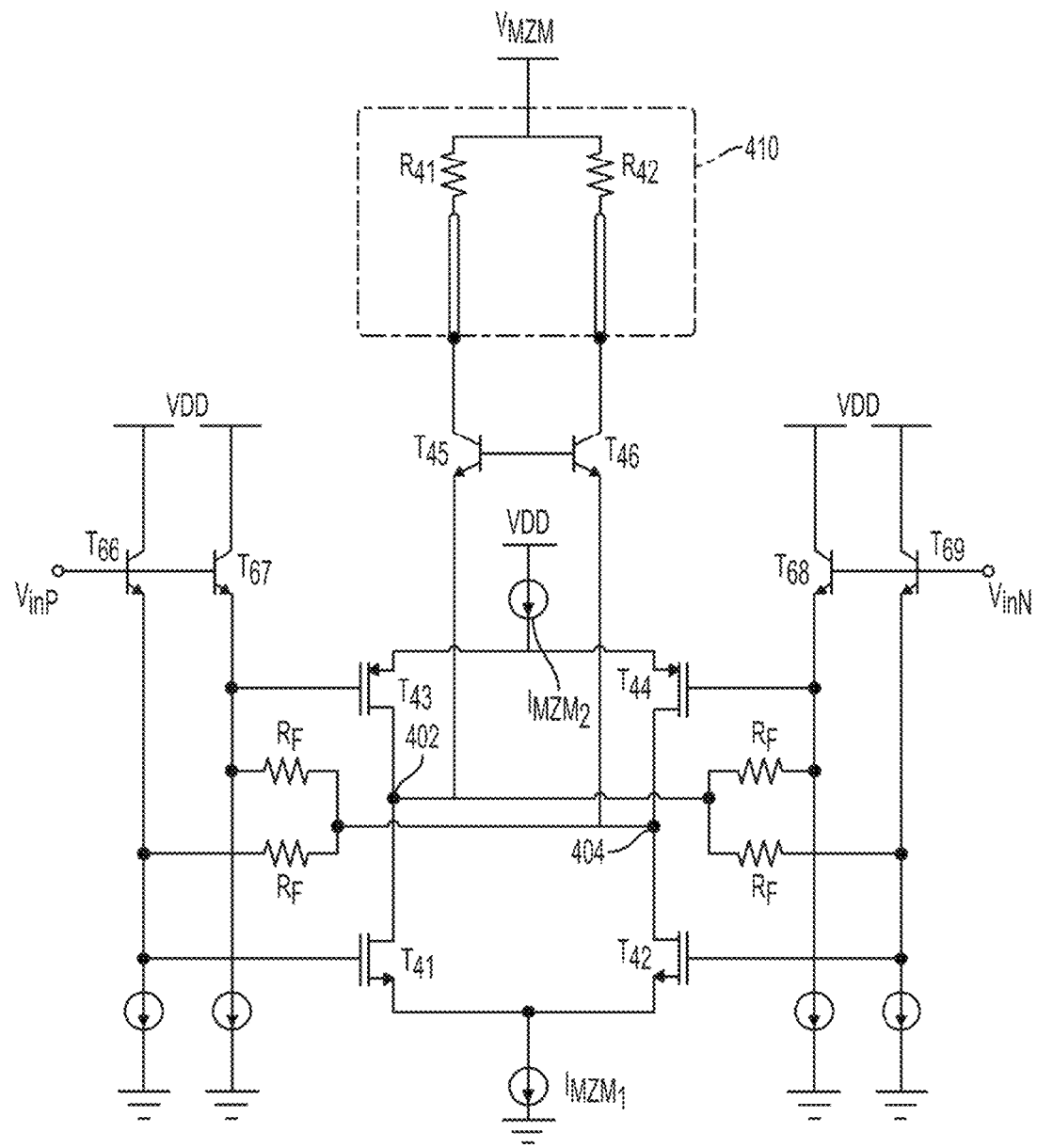
FIG. 6A is a circuit diagram illustrating an example of a modulator driver comprising a plurality of biasing circuits, according to some non-limiting embodiments.

FIG. 6A illustrates an alternative implementation of modulator driver 220, according to some non-limiting embodiments. The modulator driver of FIG. 6A may comprise some or all the components of modulator driver 400. In addition, such a modulator driver may comprise separate bias circuits for the first and second transconductance stages. As illustrated, transistor T66 may bias transistor T41, transistor T67 may bias transistor T43, transistor T68 may bias transistor T44, and transistor T69 may bias transistor T42. In this configuration, each transistor may be driven at a bias point that is independent of the others, thus allowing for the optimization of each transistor independently.

Figure 6B:
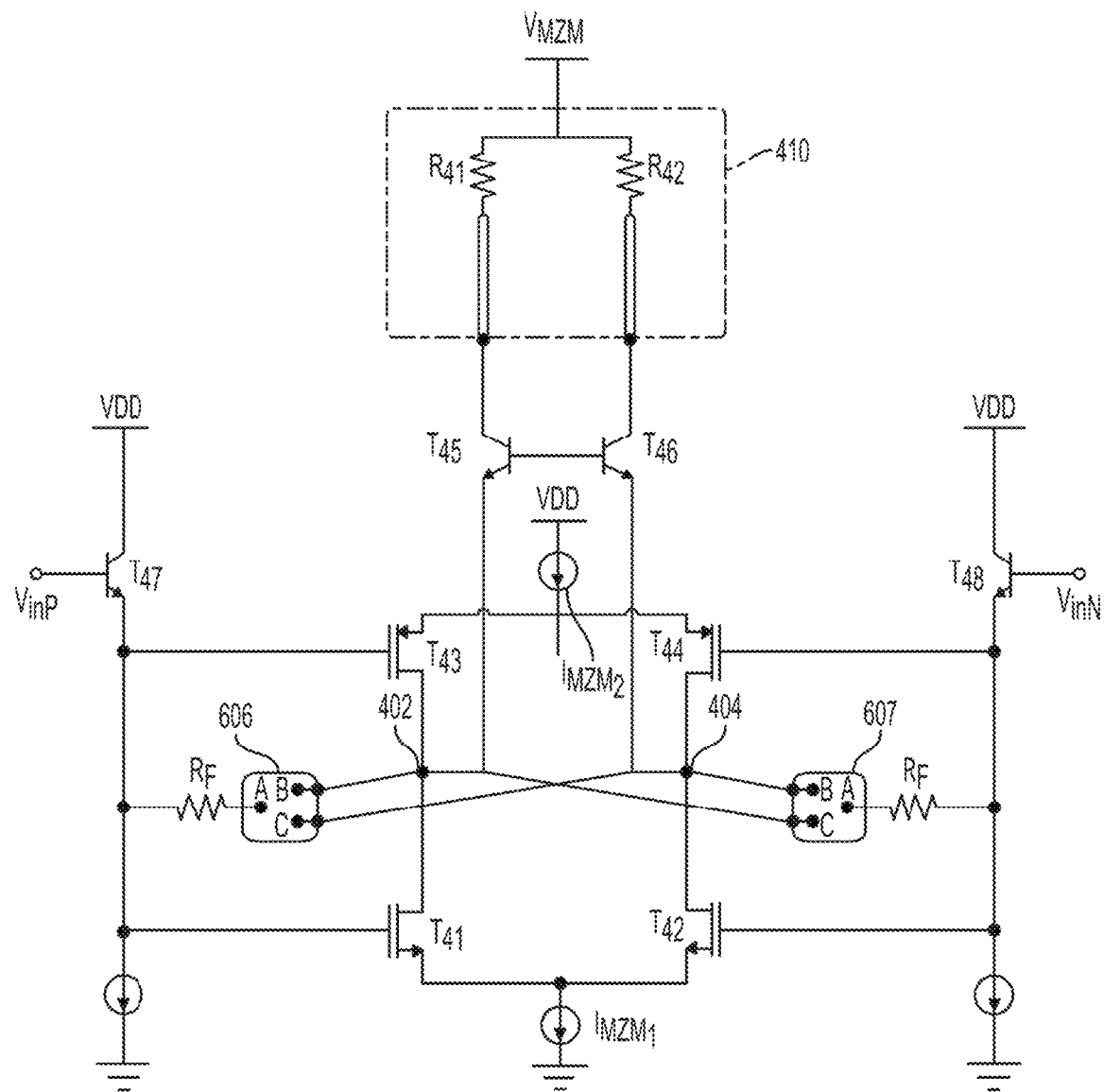
FIG. 6B is a circuit diagram illustrating an example of a modulator driver comprising switches for switching between a feedback configuration and a feedforward configuration, according to some non-limiting embodiments.

In some embodiments, the amplitude of the input signal may not be known a priori. However, the modulator driver may respond differently depending on whether the amplitude is large (e.g., at least $\frac{1}{3}V_{DD}$ or at least $\frac{1}{2}V_{DD}$) or small (e.g., less than $\frac{1}{3}V_{DD}$ or less than $\frac{1}{2}V_{DD}$). In some embodiments, a modulator driver may be arranged to operate in feedback configuration when the amplitude of the input signal is small, and to operate in a feedforward configuration when the amplitude of the input signal is large. FIG. 6B illustrates a modulator driver having switches 606 for switching between the two configurations. When it is determined that the amplitude of the input signal is large, the terminals "A" of the switches 606 may be connected to the terminals "C", thus causing the modulator driver to operate in a feedforward configuration (as shown in FIG. 5B). By contrast, when it is determined that the amplitude of the input signal is small, the terminals "A" of the switches 606 may be connected to the terminals "B", thus causing the modulator driver to operate in a feedback configuration (as shown in FIG. 5A). In this way, the modulator driver may exhibit an appropriate degree of linearity that is independent of the amplitude of the input signal.

Figure 6C:
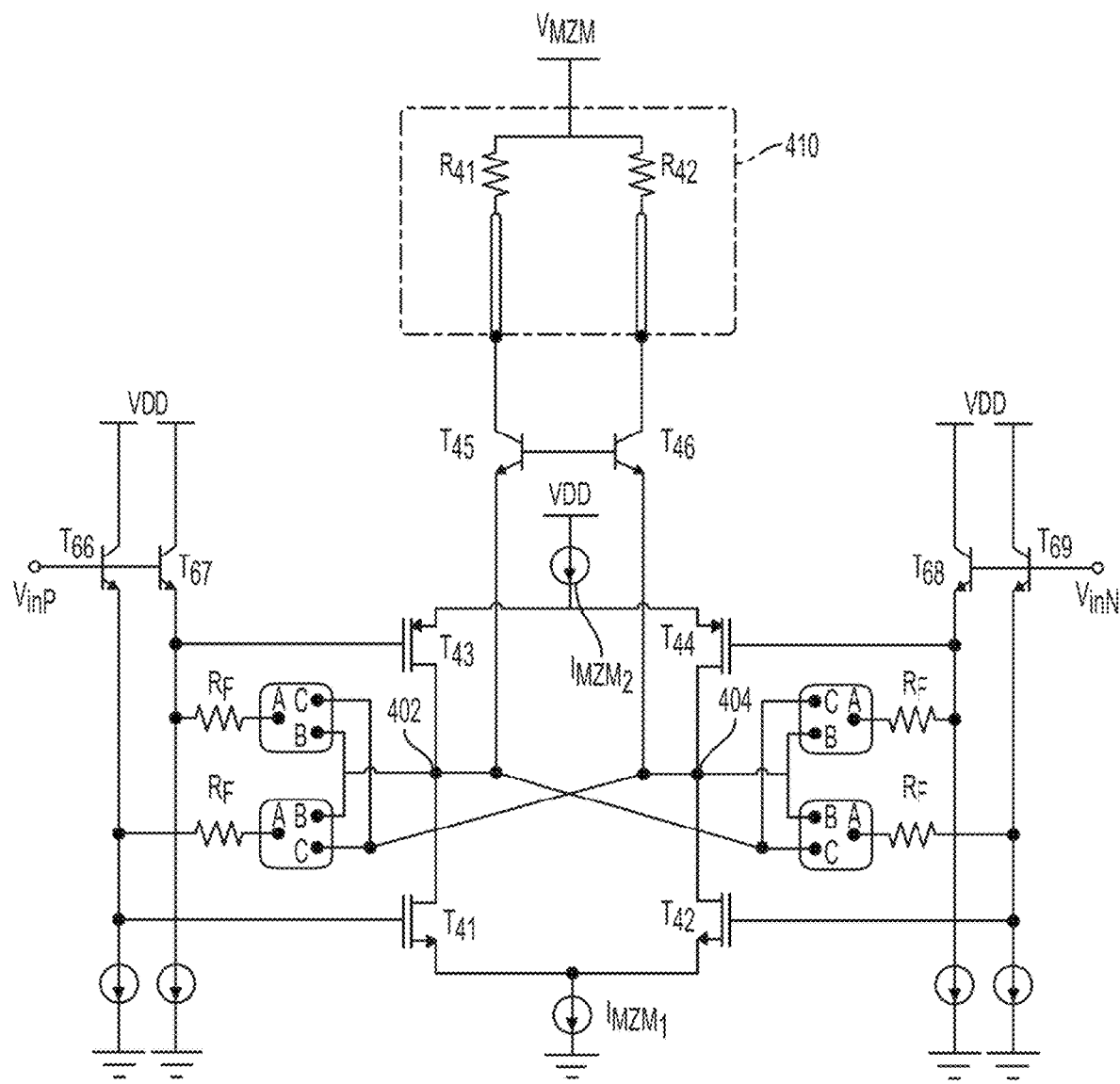
FIG. 6C is a circuit diagram illustrating an example of a modulator driver comprising a plurality of biasing circuits and switches for switching between a feedback configuration and a feedforward configuration, according to some non-limiting embodiments.

FIG. 6C illustrates another alternative embodiment, in which the modulator driver may comprise separate bias circuits, as in FIG. 6A, and switches 606, as in FIG. 6B.

Figure 6D:
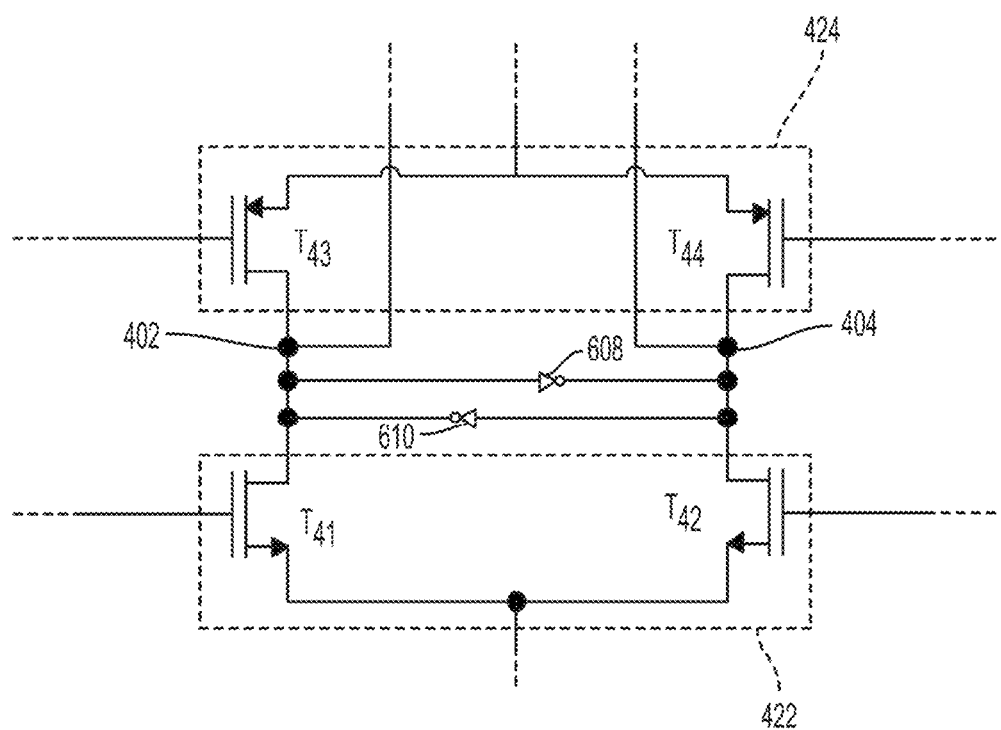
FIG. 6D is a circuit diagram illustrating a portion of a modulator driver, the modulator driver comprising a plurality of inverters, according to some non-limiting embodiments.

The embodiments described above utilize resistors to provide feedback and feedforward. In other embodiments, active components may be used. The active components may provide feedback and/or feedforward while also providing gain. One example of an active component is an inverter. FIG. 6D is a circuit diagram of a portion of a modulator driver comprising a plurality of inverters. While only a portion of the modulator driver is shown, the modulator driver of FIG. 6D may be implemented using any one of the embodiments described herein. In this case, inverters 608 and 610 may be coupled between node 402 and node 404. Inverters 608 and 610 may be connected such that the input terminal of inverter 608 is coupled to the output terminal of inverter 610 and the input terminal of inverter 610 is coupled to the output terminal of inverter 608. Being active, inverters 608 and 610 may be configured to boost the signals appearing at nodes 402 and 404. In some embodiments, the gain of inverters 608 and 610 is adjustable.

Figure 7:
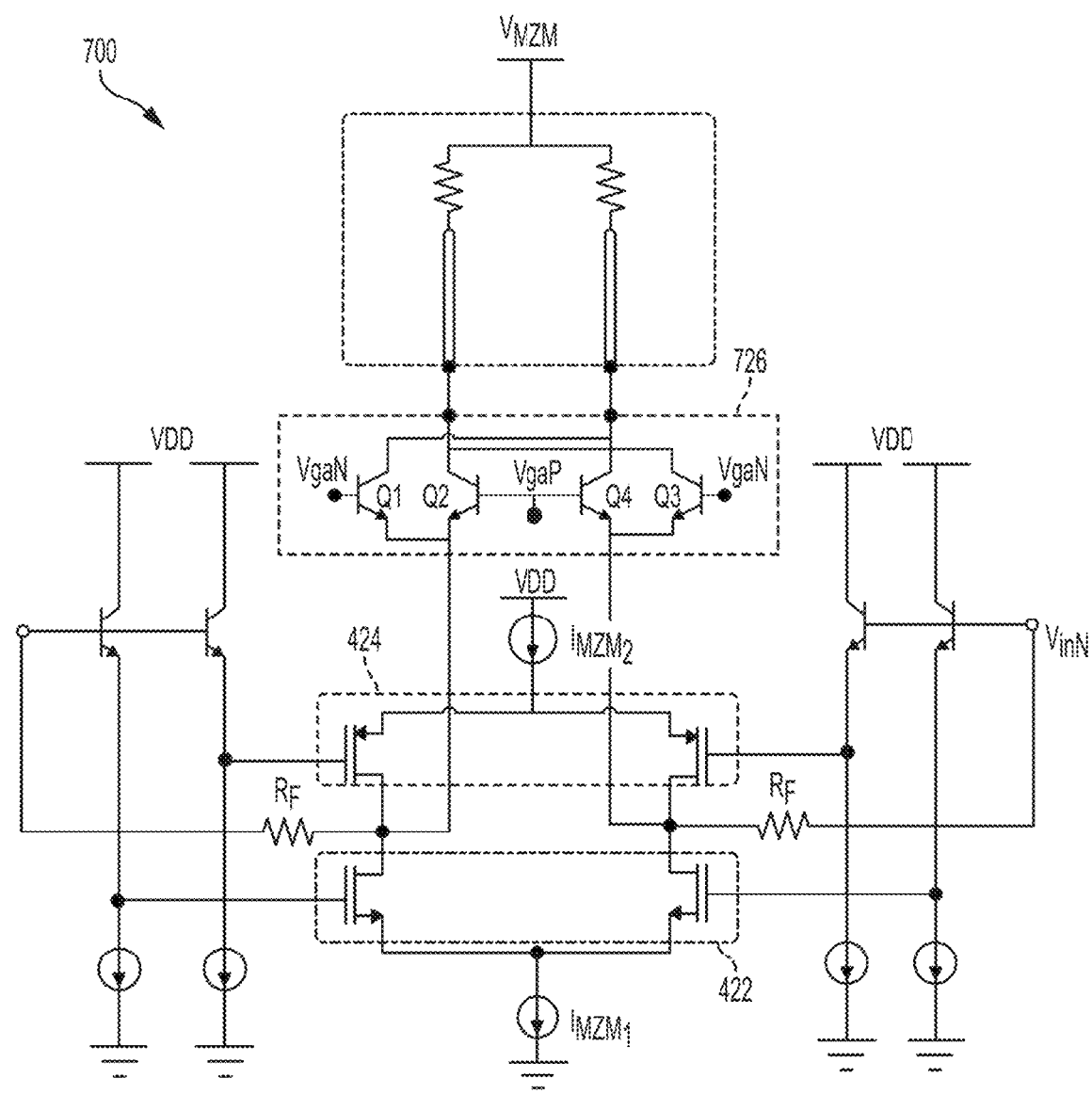
FIG. 7 is a circuit diagram illustrating an example of a modulator driver comprising a first transconductance stage, a second transconductance stage and a Gilbert cell, according to some non-limiting embodiments.

In some embodiments, it may be desirable to adjust the gain associated with a modulator driver. In this way, a desired signal amplitude may be provided to the RF path of a Mach Zehnder modulator. Having the freedom to adjust the signal amplitude may provide the ability to adjust the extinction ratio of the modulated optical signal depending on the desired modulation format, such as BPSK, QPSK, 4-QAM, 16-QAM, 32-QAM, 64-QAM, or any other suitable type of modulation. FIG. 7 illustrates an alternative implementation of modulator driver 220, configured to provide gain control, according to some non-limiting embodiments. Modulator driver 700 may comprise some or all the components of modulator driver 400. However, the current buffer may be implemented using a Gilbert cell 726. The Gilbert cell may comprise transistors Q1, Q2, Q3 and Q4. Transistors Q1 and Q3 may have base terminals connected to the input terminal labeled $V_{GaN}$ and transistors Q2 and Q4 may have base terminals connected to the input terminal labeled $V_{GaP}$. Signals $V_{GaN}$ and $V_{GaP}$ may be used to adjust the gain of modulator driver 700, thus adjusting the output signal amplitude.

Figure 8:
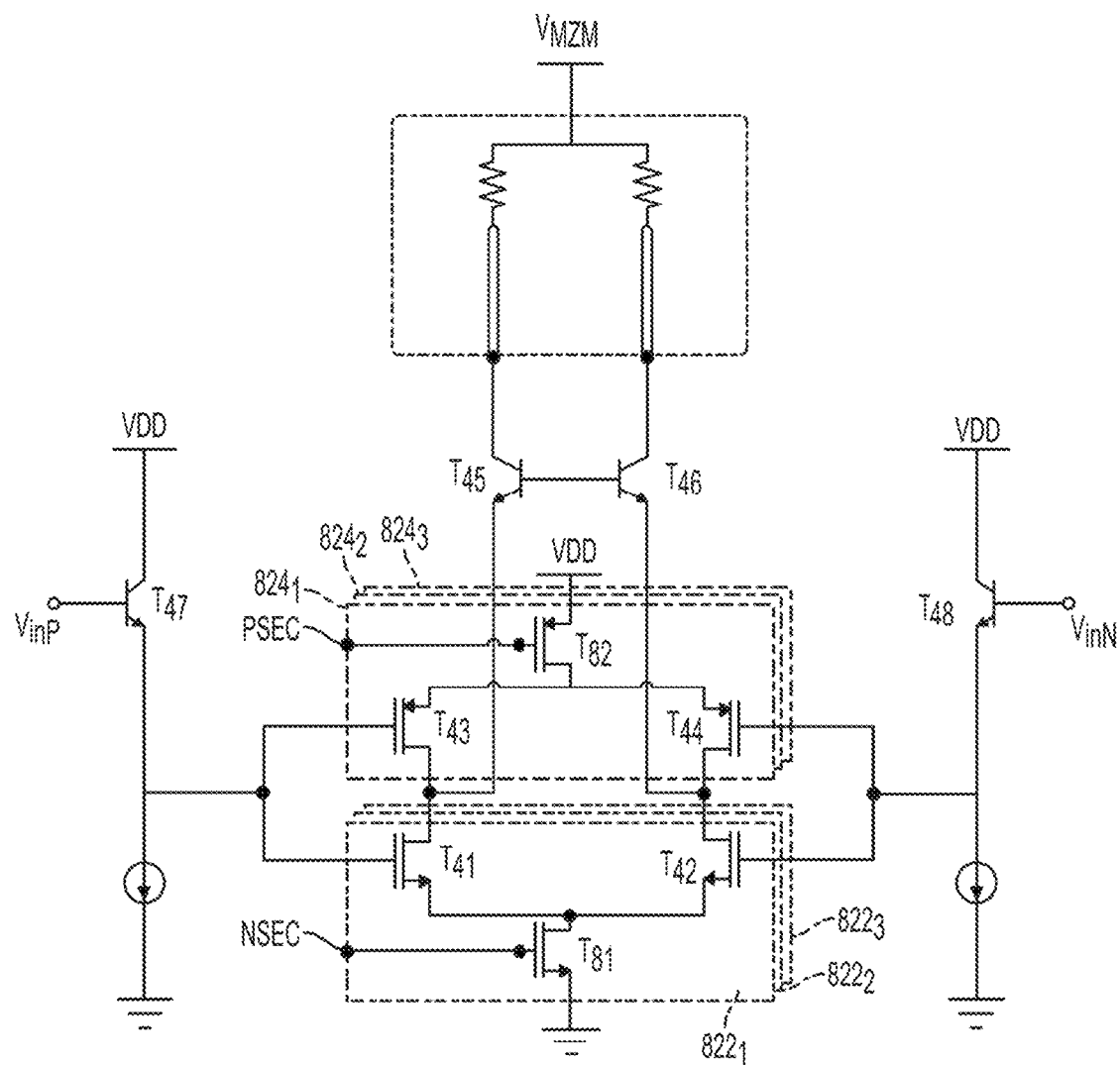
FIG. 8 is a circuit diagram illustrating an example of a modulator driver configured to provide controllable gain, according to some non-limiting embodiments.

An alternative approach to provide gain control is to select, from among a plurality of transconductance stages having different transconductance gains, one or more specific transconductance stages. In this way, a desired transconductance gain may be provided. FIG. 8 illustrates an alternative implementation of modulator driver 220, configured to provide gain control, according to some non-limiting embodiments. In addition to modulator driver 400, modulator driver 800 may comprise a plurality of transconductance stages, such as transconductance stages $822_1$, $822_2$ and $822_3$, of the type described in connection with FIG. 4A, connected in parallel. The transistors T41 and T42 may have transconductance gains that vary across the transconductance stages. Each transconductance stage may also comprise a select transistor T81. The select transistors may be configured to, in response to receiving a control signal NSEC, place the corresponding transconductance stage in an ON or OFF state. By selecting a suitable combination of transconductance stages, a desired transconductance gain may be provided.

Similarly, modulator driver 800 may comprise a plurality of transconductance stages $824_1$, $824_2$ and $824_3$, of the type described in connection with FIG. 4A, connected in parallel. The transistors T43 and T44 may have transconductance gains that vary across the transconductance stages. Each transconductance stage may also comprise a select transistor T82. The select transistors may be configured to, in response to receiving a control signal PSEC, place the corresponding transconductance stage in an ON or OFF state, thus providing a desired transconductance gain. While the illustrated embodiment shows three transconductance stages for the p-side and three transconductance stages for the n-side, the application is not limited in this respect as any other suitable number of transconductance stages may be used.

Figure 9:
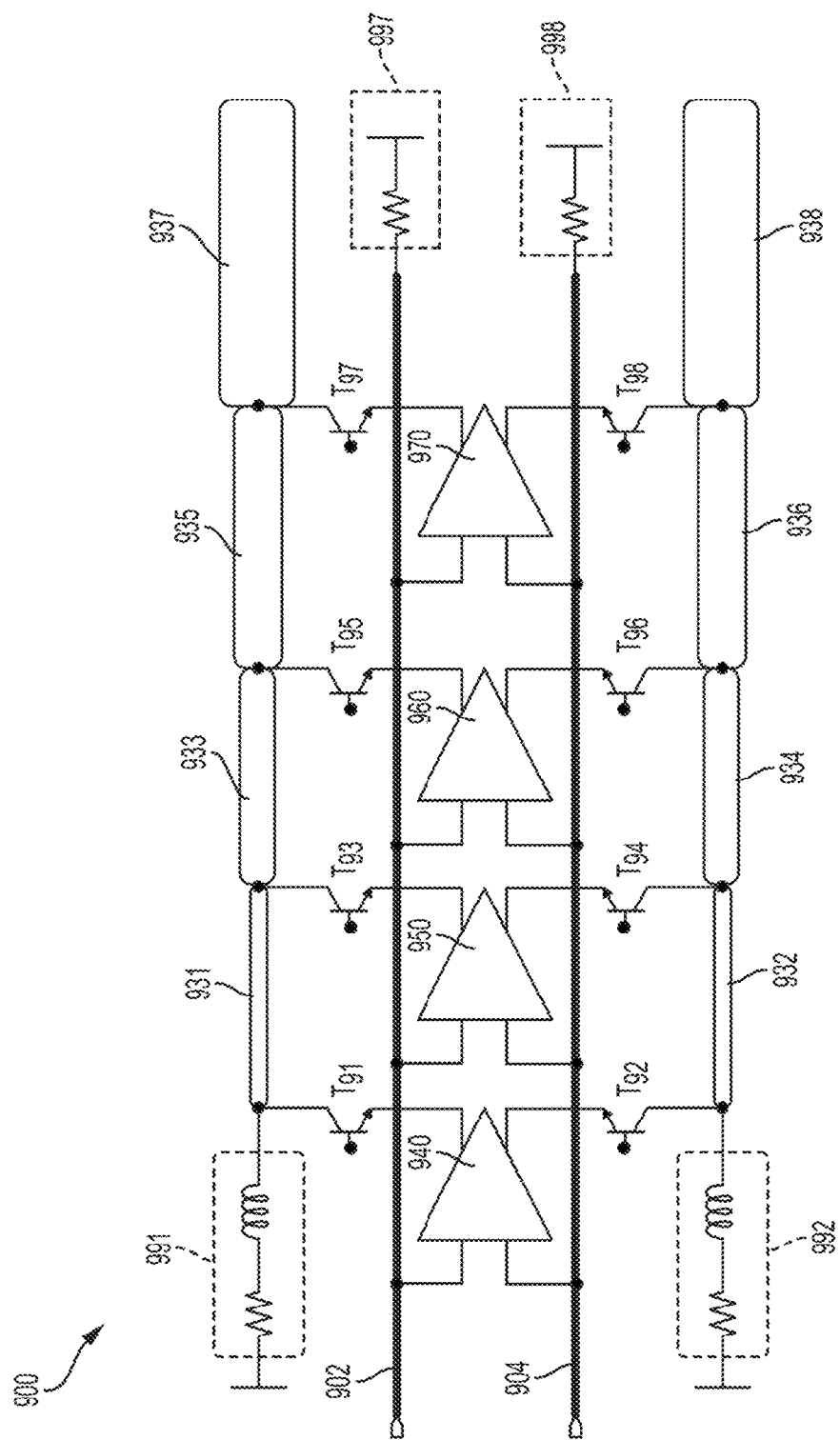
FIG. 9 is a block diagram illustrating a Mach Zehnder modulator coupled to a plurality of modulator drivers, according to some non-limiting embodiments.

In some embodiments, a Mach Zehnder modulator may comprise a plurality of RF paths. The RF paths may be connected in series with one another, and may be configured to limit back reflections in the driving signals, for example by providing RF paths having different impedances along the signal path. In some circumstances, back reflections may deteriorate the performance of a Mach Zehnder modulator by limiting the maximum extinction ratio achievable. In some embodiments, the RF paths of a Mach Zehnder modulator may be coupled to different modulator drivers of the type described herein. FIG. 9 is a block diagram illustrating a Mach Zehnder modulator 900 having a plurality of RF paths. For example, one arm of the Mach Zehnder modulator may comprise RF paths 931, 933, 935 and 937 while the other arm may comprise RF paths 932, 934, 936 and 938. However, Mach Zehnder modulator 900 is not limited to any specific number of RF paths. The impedance of the RF paths may be varied along the signal path. For example, the impedance of RF path 937 may be less than the impedance of RF path 935, which may be less than the impedance of RF path 933, etc. In this way, back reflections may be limited. The RF paths may be coupled to corresponding modulator drivers. For example, RF paths 931 and 932 may be coupled to stage 940, which may comprise a pair of transconductance stages as described in connection with FIG. 2A, and to transistors T91 and T92 which may serve as transistors T45 and T46 of FIG. 4A. Similarly, RF paths 933 and 934 may be coupled to stage 950 and transistors T93 and T94, RF paths 935 and 936 may be coupled to stage 960 and transistors T95 and T96 and RF paths 937 and 938 may be coupled to stage 970 and transistors T97 and T98. The stages may receive input signals through input terminals 902 and 904, which may be terminated with RF terminations 997 and 998. The RF paths may be terminated with RF terminations 991 and 992. The gain of the stages 940 . . . 970 may be adjusted to limit back reflections.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide a modulator driver for Mach Zehnder modulators that exhibits a lower power consumption compared to conventional modulator drivers. In some embodiments, power consumption may be reduced by limiting the DC signal applied to a current buffer.

Aspects of the present application provide a modulator driver for Mach Zehnder modulators in which the linearity of the response can be increased without sacrificing power consumption, by decoupling the AC signal path from the DC signal path. In some embodiments, limiting the DC signal applied to a current buffer may limit power consumption while at the same time maximizing the AC signal applied to the current buffer may boost the linearity.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. An integrated optical device, comprising:
   a Mach Zehnder Modulator (MZM) comprising an optical path and a radiofrequency path; and
   means for driving the MZM to modulate an optical signal, wherein the means comprises:
      a first transconductance stage and a second transconductance stage, wherein the first and second transconductance stages are configured such that DC outputs of the first and second transconductance stages are subtractively combined and AC outputs of the first and second transconductance stages are additively combined; and a current buffer coupled to the RF path, the first transconductance stage, and the second transconductance stage.

2. The integrated optical device of claim 1, further comprising an input driver electrically coupled to a first control terminal of the first transconductance stage and to a second control terminal of the second transconductance stage.

3. The integrated optical device of claim 1, wherein the current buffer comprises at least one heterojunction bipolar transistor (HBT).

4. The integrated optical device of claim 1, wherein the current buffer comprises at least one transistor arranged in a common-base configuration.

5. The integrated optical device of claim 1, wherein the first transconductance stage comprise at least one NMOS transistor and the second transconductance stage comprise at least one PMOS transistor.

6. The integrated optical device of claim 1, wherein the first transconductance stage is configured to receive a first supply voltage and the second transconductance stage is configured to receive a second supply voltage that is lower than the first supply voltage.

7. The integrated optical device of claim 1, wherein the first transconductance stage and the current buffer collectively form a cascode transconductance stage.

8. The integrated optical device of claim 1, wherein the first transconductance stage is configured to drive a first DC current in the current buffer in a first direction and the second transconductance stage is configured to drive a second DC current in the current buffer in a second direction opposite the first direction.

9. The integrated optical device of claim 1, wherein the RF path of the MZM is configured to:
receive the AC outputs from the buffer driver; and
modulate the optical signal as the optical signal propagates along the optical path with the AC outputs.

10. The integrated device of claim 9, wherein the RF path is configured to modulate the optical signal by shifting a phase of the optical signal with a pn-junction phase shifter.

11. The integrated device of claim 1, further comprising a feedback resistor coupled to the first transconductance stage and the second transconductance stage.

12. The integrated optical device of claim 1, wherein the MZM comprises:
a silicon waveguide including a pn-junction;
first and second dielectric regions disposed on opposite sides of the silicon waveguide, the first dielectric region being doped with a p-doping material and the second dielectric region being doped with an n-doping material, wherein the first and second dielectric regions are both shallower than the silicon waveguide; and
first and second electrodes disposed on the first and the second dielectric regions, respectively.

13. The integrated optical device of claim 1, wherein the means comprises a first transconductance stage comprising comprises a first transistor and a second transistor, wherein the first transistor and the second transistor are biased by a current mirror.

14. The integrated optical device of claim 1 further comprising a current generator in electrical communication with the means, wherein the means is a modulator driver.

15. The integrated optical device of claim 1 further comprising a current buffer, wherein the means is a modulator driver, the current buffer coupled to the modulator driver.

16. An integrated optical device, comprising:
a Mach Zehnder Modulator (MZM) comprising an optical path and a radio frequency (RF) path; and
a modulator driver coupled to the RF path of the MZM, the modulator driver comprising:
a first transconductance stage;
a second transconductance stage connected with the first transconductance; and
a current buffer coupled to the first and second transconductance stages,
wherein the first transconductance stage comprises a first terminal, the second transconductance stage comprises a second terminal and the current buffer comprises a third terminal, and wherein the first terminal is connected to the second terminal and to the third terminal.

17. The integrated optical device of claim 16, wherein the current buffer is configured to bias the first transconductance stage and the second transconductance stage.

18. The integrated optical device of claim 16, wherein the first transconductance stage and the current buffer collectively form a cascode transconductance stage.

19. The integrated optical device of claim 16, wherein the RF path of the MZM is configured to:
receive an AC signal from the buffer driver; and
modulate an optical signal propagating along the optical path with the AC signal.

20. A method of controlling a modulator driver comprising a first transconductance stage, a second transconductance stage and a current driver, the method comprising:
controlling the first transconductance stage to provide a first alternate current (AC) signal and a first direct current (DC) signal to the current buffer;
controlling the second transconductance stage to provide a second alternate current (AC) signal and a second direct current (DC) signal to the current buffer, wherein the first and second AC signals have common orientations and the first and second DC signals have opposite orientations; and
in response to receiving the first and second AC signals, controlling the current driver to modulate an optical signal propagating along a Mach Zehnder Modulator (MZM).

21. The method of claim 20, wherein controlling the current driver to modulate the optical signal comprises controlling the current driver to vary a carrier density in a semiconductor device.

22. The method of claim 20, further comprising:
receiving, at the first transconductance stage, a first supply voltage; and
receiving, at the second transconductance stage, a second supply voltage lower than the first supply voltage.

23. A method for modulating an input optical signal with data, the method comprising:
using multiple transconductance stages of a Mach Zehnder Modulator (MZM) driver to supply a first electrical modulating signal to a first arm of a MZM configured to support a first optical signal, and to supply a second electrical modulating signal to a second arm of the MZM configured to support a second optical signal, the first and second electrical modulating signals having direct currents of opposite orientations.

24. The method of claim 23, wherein the first and second optical signals are derived from the input optical signal.

25. The method of claim 23, wherein the first and second electrical modulating signals have alternate currents of a same orientation.

26. An integrated optical device, comprising:
a Mach Zehnder Modulator (MZM) comprising an optical path and a radiofrequency (RF) path;
a first transconductance stage;
a second transconductance stage; and
a current buffer coupled to one or more of the RF path, the first transconductance stage, and the second transconductance stage, wherein one or more of the first transconductance stage and the second transconductance stage are configured to drive the MZM to modulate an optical signal, the MZM comprising a first arm and a second arm, wherein the MZM is configured to receive a first electrical modulating signal at the first arm and a second electrical modulating signal at the second arm, the first and second electrical modulating signals having direct currents of opposite orientations.

27. The integrated optical device of claim 26, wherein the first and second transconductance stages are configured such that DC outputs of the first and second transconductance stages are subtractively combined.

28. The integrated optical device of claim 26, wherein AC outputs of the first and second transconductance stages are additively combined.

29. The integrated optical device of claim 26 wherein the first transconductance stage comprises a first terminal, the second transconductance stage comprises a second terminal, wherein the first terminal is connected to the second terminal.

30. The integrated optical device of claim 26 wherein the first transconductance stage comprises a first terminal, the second transconductance stage comprises a second terminal, wherein the first terminal is connected to the second terminal, the MZM comprising a first arm and a second arm, wherein the MZM is configured to receive a first electrical modulating signal at the first arm and a second electrical modulating signal at the second arm.

* * * * *